Nov. 30, 1937.  A. J. BOND  2,100,428
FISHING ROD AND REEL
Filed Dec. 21, 1936      2 Sheets-Sheet 1
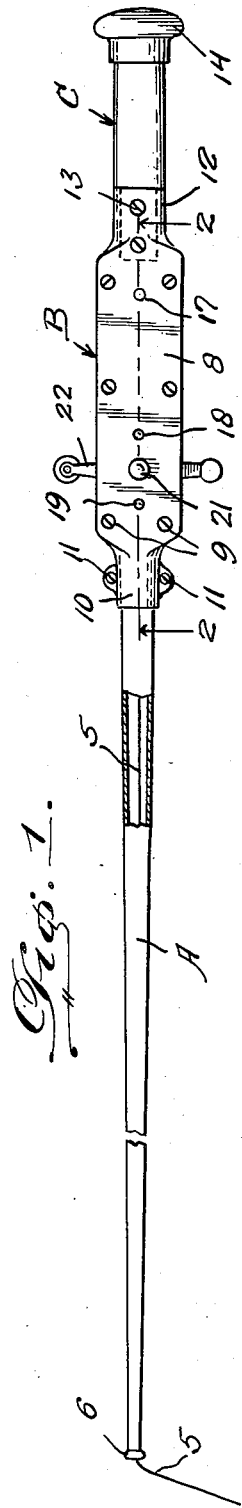
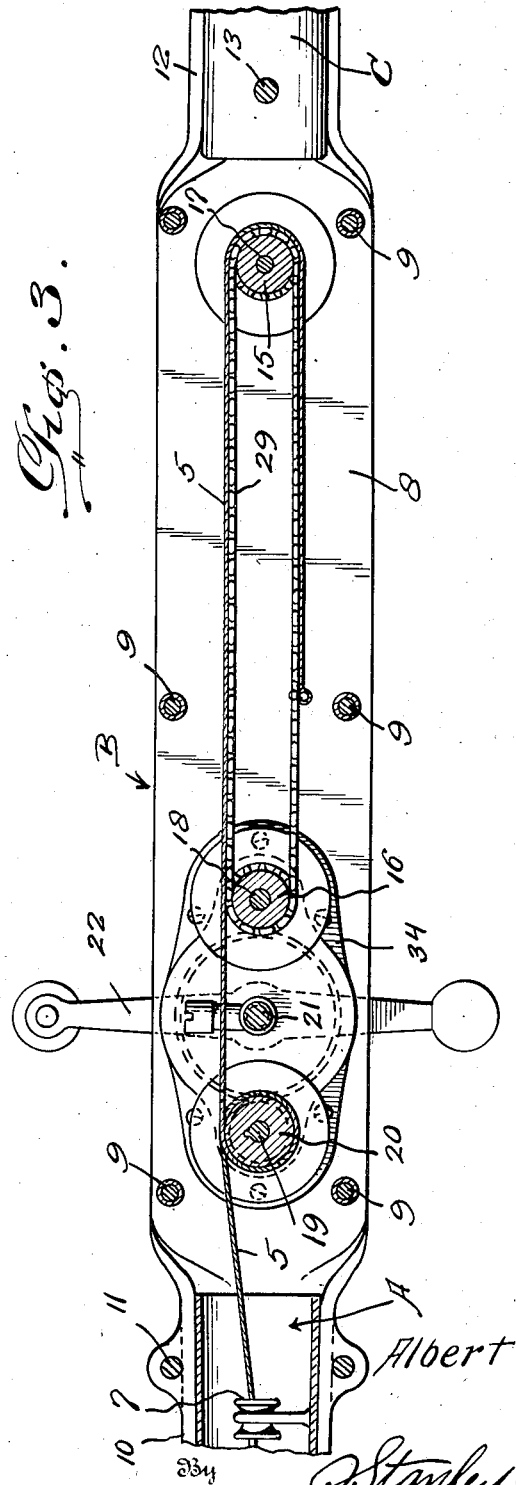
Inventor
Albert J. Bond,
By J. Stanley Burch
Attorney

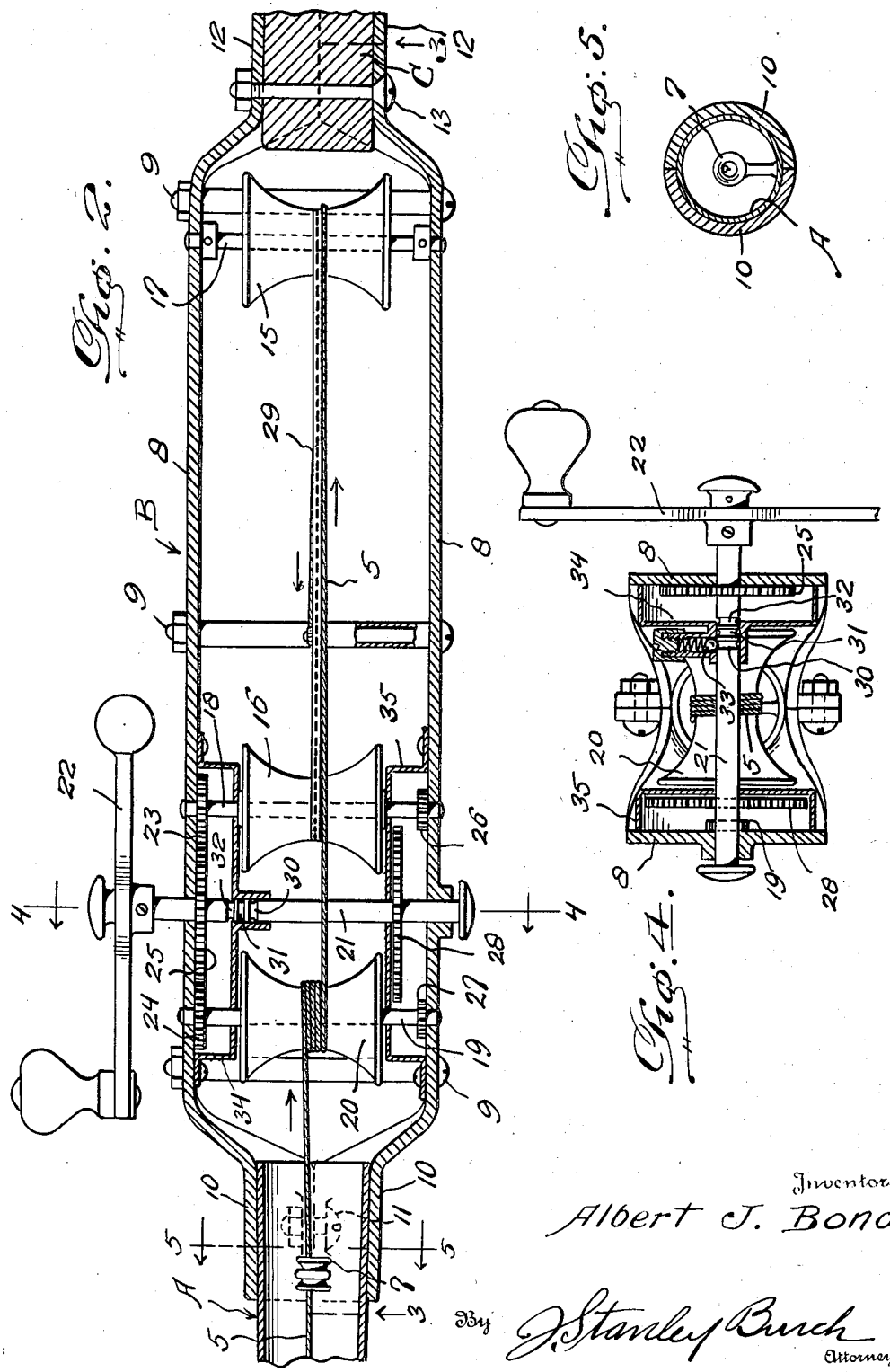

Patented Nov. 30, 1937

2,100,428

UNITED STATES PATENT OFFICE 2,100,428

FISHING ROD AND REEL

Albert Johnston Bond, Mercedes, Tex., assignor of forty-nine percent to Lewie H. Henry, Mercedes, Tex.

Application December 21, 1936, Serial No. 117,084

4 Claims. (Cl. 43—20)

This invention relates to an improved fishing rod and reel, and the novelty of the invention resides in the construction of the reel itself, as well as the construction of the fishing rod of which the reel forms a part.

More particularly, an object of the present invention is to provide an improvement in the type of fishing reel which embodies two spaced spools operatively connected by an endless band or chain to which the end of the fishing line is attached, so that the line becomes wound about both spools in the form of a skein.

With reels heretofore devised, the fishing line continues to build up on the reel as the line is retrieved and the pull is directly on the reel, so that the act of retrieving becomes increasingly difficult and the leverage or power opposing the pull on the line continues to decrease as the line builds up on the reel.

An important object of the present invention, therefore, is to overcome these difficulties and objections by providing a reel of the above kind in which a strain-relieving or cat-head spool is provided for initially receiving the line just prior to its passage to the reel, the cat-head spool being driven by the same means and at the same speed as the driven spool of the reel. By the use of this cat-head spool, the reel is relieved of the direct pull on the line, and the leverage or power opposing the pull on the line is always the same and is not decreased as the line is retrieved.

Another object of the present invention is to provide a fishing rod of which the reel forms a part and in the butt end of which the reel is incorporated in a novel manner, the major outer portion of the rod being of hollow form to permit the passage of the line therethrough and avoid the necessity of a plurality of line guides on the exterior of the rod, as well as the possibility of ready tangling of the line in the act of fishing. One advantageous and desirable result of such a construction is to provide a well balanced reel and rod providing the same leverage and balance at all times, whereby use of the rod and reel is neither arduous or difficult.

With the above general objects in view, the present invention consists in the novel form, combination and arrangement of parts hereinafter more fully described, shown in the accompanying drawings and claimed.

In the drawings:

Figure 1 is a side elevational view, partly broken away and in section, of a fishing rod and reel constructed in accordance with the present invention.

Figure 2 is an enlarged longitudinal section taken on line 2—2 of Figure 1.

Figure 3 is a longitudinal section on line 3—3 of Figure 2.

Figure 4 is a transverse section on line 4—4 of Figure 2; and

Figure 5 is a transverse section on line 5—5 of Figure 2.

Referring more in detail to the drawings, the preferred and illustrated embodiment of the present invention consists of a combined fishing rod and reel in which the major outer portion of the rod indicated at A is in the form of a continuous or sectional hollow spring steel rod or the like through which passes the fishing line 5, and whereby only two line guides are required including a hollow bead tip 6 at the outer end of the rod section A and a hollow guide 7 suitably mounted axially of and within the inner larger end of said rod section A as shown more clearly in Figures 2 and 3.

The present device or invention also embodies an improved special construction of reel constituting an outer butt section B of the fishing rod, the butt of the rod also including an inner end or handle section C.

The reel or outer butt section B consists of a suitable frame composed of a pair of spaced parallel frame plates 8 rigidly connected in spaced parallel relation as at 9 and formed at their outer ends with cooperating semi-cylindrical portions 10 bolted together as at 11 and having the inner end of the outer rod section A clamped therebetween. The handle section C is held at one end between similar semi-cylindrical inner end portions 12 provided on the inner ends of the frame plates 8 and bolted together as at 13, the inner free end of handle section C being provided with a suitable rubber or like butt piece or cap 14.

The reel further consist of two separate spools 15 and 16 which are spaced apart, the spool 15 being carried by a supporting shaft 17 at the inner end of the frame embodying plates 8, and the spool 16 being journaled near but forwardly of the center of such frame and secured upon a rotatable supporting shaft 18. Also journaled in the frame forwardly or outwardly of the spool 16 is a further shaft 19 on which is secured a retrieving or cat-head spool 20. Further, an operating shaft 21 is journaled in the frame intermediate the shafts 18 and 19 and the spools 16 and 20 carried thereby, and the shaft 21 has an exteriorly projecting end on which is secured an operating crank 22. This shaft 21 is also slidable transversely through the frame for a purpose which will be presently described.

Secured on the shafts 18 and 19 near one side of the frame are similar gears 23 and 24, and carried by the shaft 21 near this side of the frame is a gear 25 adapted to be simultaneously meshed with the gears 23 and 24 when the shaft 21 is in one position of its sliding adjustment in the frame, whereby shaft 21 may be operated through the medium of crank 22 to simultaneously drive the spools 16 and 20 at a predetermined and similar speed. Other gears 26 and 27 are respectively secured on the shafts 18 and 19 near the other side of the frame, and a further gear 28 is carried by shaft 21 so that it may be meshed with the gears 26 and 27 in another position of axial sliding adjustment of shaft 21 for simultaneously driving the spools 16 and 20 at the same but at a different predetermined speed than secured by the meshing of gears 23 and 24 with gear 25. As shown, the meshing of gear 25 with gears 23 and 24 brings about a slow speed drive of spools 16 and 20 as required under certain conditions of use, while the meshing of gear 28 with gears 26 and 27 provides for a higher speed of rotation of spools 16 and 20 under a corresponding speed of rotation of shaft 21 so that fact retrieving of the line may be effected. In either event, the spools 15 and 16 are always driven at the same speed as spool 20, and the same amount of line is wound in hank form about the spools 15 and 16 as is retrieved by the cat-head spool 20 around which the line is passed several times before being passed rearwardly and attached to the endless belt or chain 29 which passes about and operatively connects the spools 15 and 16. By passing the line about the cat-head spool 20 the endless belt or chain 29 is relieved of any pull or pulling strain, thereby providing a constant leverage and ease of operation. It might also be noted that the shaft 21 is capable of a third position of axial sliding adjustment wherein both the gear 28 and gear 25 are out of mesh with their cooperating gears 26 and 27 and 23 and 24 respectively. This may be defined as a neutral position wherein the cat-head spool and the spools 15 and 16 are freed of driving connection with the shaft 21 so that the line 5 may be readily and quickly paid out as in casting.

To provide for convenience in proper positioning of the shaft 21 in its three positions of adjustment and to releasably maintain it in any of such positions of adjustment, the shaft 21 may have three adjacent annular grooves 30, 31 and 32 for reception of a spring pressed latching ball or detent 33 carried by and arranged at the inner side of a casing or housing 34 for the gears 23, 24 and 25 attached to the adjacent frame plate 8. If desired, a similar casing or housing 35 may be provided for the gears 26, 27 and 28 and attached to the other frame plate 8, for the purpose of protecting these gears from moisture and possible contact with the fishing line or the person of the user of the present fishing rod and reel. It will be noted that when the shaft 21 is positioned so that the detent 33 engages the groove 30, the gear 25 will be meshed with gears 23 and 24 and the gear 28 will be out of engagement with gears 26 and 27, thereby permitting driving of the spools 16 and 20 at a relatively low speed. When the shaft 21 is positioned so that the detent 33 engages the groove 31, the gearing will be in neutral with gears 25 and 28 out of mesh with gears 23 and 24 and gears 26 and 27. On the other hand, when the shaft 21 is positioned so that detent 33 engages groove 32, the gear 25 will be disengaged from gears 23 and 24 and gear 28 will be engaged with gears 26 and 27 to permit driving of the spools 16 and 20 at a relatively higher speed. This gear shifting operation is simply had by manually effecting axial movement of shaft 21 by pressing or pulling on the end thereof which carries the crank 22. Any conventional form of friction brake may be provided for the spool 15 to avoid unduly free rotation of the spools when intergeared or to prevent too free rotation of spools 15 and 16 when the spools 16 and 20 are not intergeared.

From the foregoing description, it is believed that the construction, advantages and operation of the present invention will be readily understood and appreciated by those skilled in the art. It will be seen that I have provided an improved reel of the type wherein the fishing line is wound about two spaced spools in the form of a skein, particularly as to the novel provision and use of the retrieving or cat-head spool 20. The construction is very simple, compact, durable and efficient, and the device in its entirety represents a combined rod and reel which is properly balanced at all times and easily and readily adapted for manipulation and use.

What I claim as new is:

1. The combination with a fishing rod having a butt section in the form of a fishing reel having two reeling spools and an endless belt or chain connecting said spools, of a retrieving or cat-head spool, a fishing line passing about said cat-head spool a plurality of times and passing to and attached at one end to said endless belt or chain, and manually operable means for simultaneously driving one of said first-named spools and said cat-head spool at the same speed.

2. The combination with a fishing rod having a butt section in the form of a fishing reel having two reeling spools and an endless belt or chain connecting said spools, of a retrieving or cat-head spool, a fishing line passing about said cat-head spool a plurality of times and passing to and attached at one end to said endless belt or chain, and manually operable means for selectively and simultaneously driving one of said first-named spools and said cat-head spool at either desired one of different speeds.

3. The combination with a fishing rod having a butt section in the form of a fishing reel having two reeling spools and an endless belt or chain connecting said spools, of a retrieving or cat-head spool, a fishing line passing about said cat-head spool a plurality of times and passing to and attached at one end to said endless belt or chain, and manually operable means for selectively and simultaneously driving one of said first-named spools and said cat-head spool at either desired one of different speeds, said last-named means comprising an axially shiftable manually rotatable driving shaft and selective gearing between said driving shaft and the last-mentioned spools.

4. The combination with a fishing rod having a butt section in the form of a fishing reel having two reeling spools and an endless belt or chain connecting said spools, of a retrieving or cat-head spool, a fishing line passing about said cat-head spool a plurality of times and passing to and attached at one end to said endless belt or chain, and manually operable means for selectively and simultaneously driving one of said first-named spools and said cat-head spool at either desired one of different speeds, said last-named means comprising an axially shiftable manually rotatable driving shaft and selective gearing between said driving shaft and the last-mentioned spools, said manually operable driving means being constructed so that axial shifting of the driving shaft will effect disconnection of the cat-head spool and the associated reeling spool therefrom.

ALBERT JOHNSTON BOND.